April 12, 1949.   S. J. GOLDBERG   2,466,985
AIRCRAFT GUN POSITION INDICATOR
Filed April 6, 1942   2 Sheets-Sheet 1
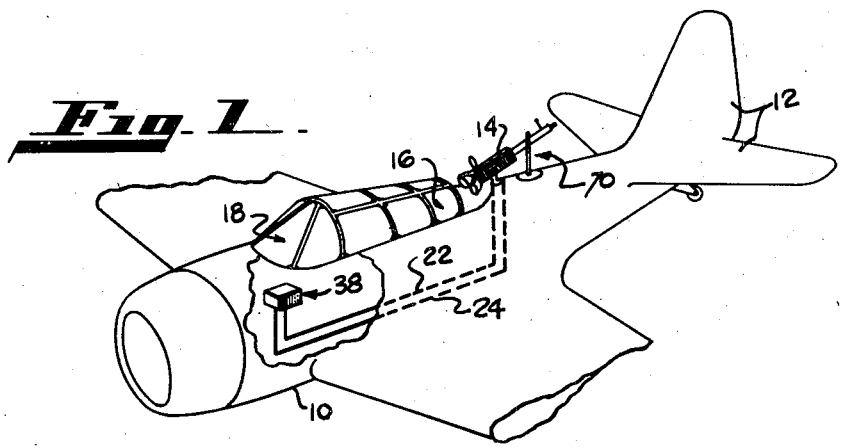
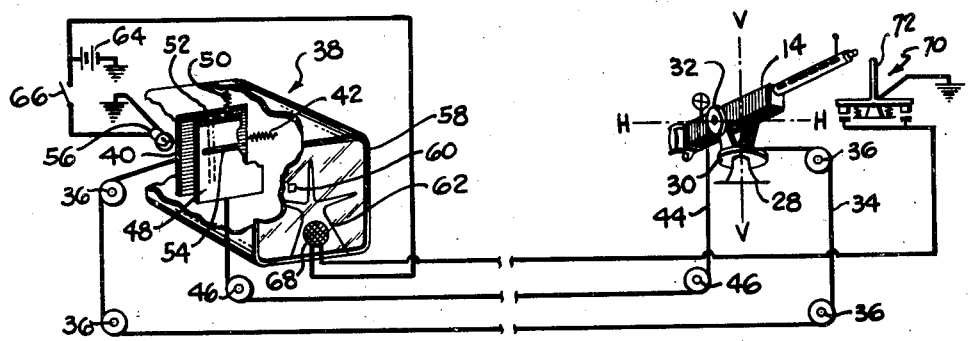
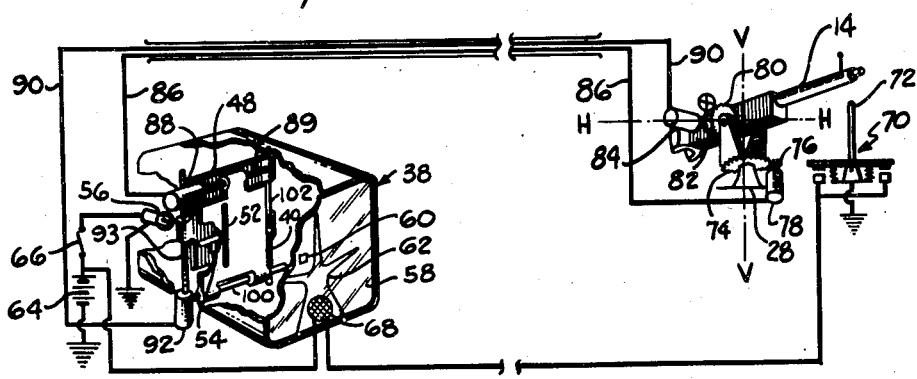
INVENTOR.
SYDNEY J. GOLDBERG
BY
Edwin Coates
ATTORNEY April 12, 1949. S. J. GOLDBERG 2,466,985
AIRCRAFT GUN POSITION INDICATOR
Filed April 6, 1942 2 Sheets-Sheet 2

INVENTOR.
SYDNEY J. GOLDBERG
BY Edwin Coates
ATTORNEY

Patented Apr. 12, 1949

2,466,985

UNITED STATES PATENT OFFICE 2,466,985

AIRCRAFT GUN POSITION INDICATOR

Sydney J. Goldberg, Santa Monica, Calif., assignor to Douglas Aircraft Company, Inc., Santa Monica, Calif.

Application April 6, 1942, Serial No. 437,855

5 Claims. (Cl. 177—311)

This invention relates to a device for indicating to the pilot of an aircraft, for example, the position of a mechanically movable piece of equipment on the aircraft which piece of equipment is not within the field of vision of the pilot under normal circumstances. More specifically the device is designed to inform the pilot of the position of a flexible gun mounted at the rear of his airplane and operable by an independent gunner.

It is an accepted fact that in aerial combat an airplane is most vunerable when attacked from the rear. Accordingly, many efforts have been made to provide and improve tail protection. It is relatively simple to mount a gun for firing aft but in order for the gun to be effective it must be flexibly mounted so that it may cover a substantial sector or all of the rearward hemisphere relative to the airplane.

Unfortunately airplanes of conventional design require stabilizing surfaces at the tail thereof and these surfaces very often, because of design requirements, are located aft of the rear gun emplacement so that they obstruct fire and one or several "blind" spots result.

The present invention takes cognizance of these facts and overcomes, to a large degree, the undesirable features of armament placed forward of stabilizing surfaces in that the device comprising the invention indicates to the pilot of a military aircraft the position of a remotely disposed armament controlled and operated by an independent gunner in order to enable the pilot to tactically cooperate with the gunner in bringing the fire power of the aircraft armament effectively to bear upon enemy aircraft in aerial combat.

Ever since rearwardly firing guns were placed on an aircraft forward of the stabilizing surfaces it has been not uncommon for a gunner, in the excitement of combat and while following his target in his gun sights, to accidentally shoot into the empennage of his own craft. To overcome this, devices have been developed which prevent the gunner from moving the gun so that it can be pointed at the empennage or which prevent the gun being fired whenever the structural parts of the airplane come within the field of fire. Such interrupters serve the purpose for which they are intended but from a tactical standpoint the occurrence of the blind spot requiring mere momentary cessation of fire gives the enemy aircraft an opening to attack.

Accordingly, it is the principal object of my invention to indicate to the pilot of an aircraft when his remotely located gunner wishes to shoot in a field obstructed by a portion of his craft so that he may maneuver the craft to clear the desired field of fire.

It is a further object of the invention to indicate to a pilot in two dimensions where his gunner is training the gun.

Another object is to indicate the path of travel of remotely located gunner-operated armament relative to the aircraft empennage.

A still further object is to indicate to the pilot when the gun is prevented from moving or prevented from firing by a safety stop.

Another object of the invention is to trace the movement of the gun with a beam of light movable in unison with the gun.

Other and further objects will become apparent after reading the specification and studying the drawings in which:

Figure 1 is a diagrammatic view in perspective of an airplane equipped with a flexible gun mounted aft of the pilot and forward of the empennage and provided with an indicator in the pilot's cockpit connected to the gun so as to visually indicate the aiming movements thereof relative to the empennage.

Figure 2 is a schematic diagram of a mechanical embodiment of the invention in which cables interconnect the gun and indicator.

Figure 3 is a schematic diagram of an electrical embodiment of the invention in which electrical pick-up devices driven by movements of the gun control corresponding electrical devices for driving the indicator in unison with the gun.

Figure 4:
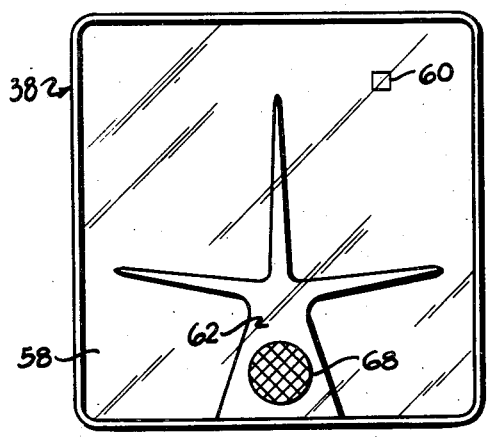
Figure 4 is a view looking into the face or screen of the indicator on which a vignette of the aircraft empennage is provided.

Referring now to Figure 1 a military aircraft 10 is shown as being provided with an empennage 12, a flexible gun 14 mounted forward of said empennage and adapted to fire in an area including said empennage, a gunner's position 16 adjacent the gun, a pilot's position 18 forward of the gunner's position, and an indicator assembly 38 located within the range of vision of the pilot. The gun and the indicator are shown as being operatively interconnected by lines 22 and 24 which lines may represent either mechanical or electrical means. Figure 1 also shows an interrupter switch assembly 70 provided just aft of the gun barrel and adapted to be engaged thereby during certain aiming movements of the gun as will be explained more fully hereinafter.

In Figure 2 the gun 14 is shown in more detail and is mounted upon a base 28 for rotation in azimuth about a vertical axis V—V and for movement in elevation about a horizontal axis H—H. A pulley 30 or the like is fixed to move with the gun about the axis V—V and a second pulley 32 is similarly fixed to move with the gun about the axis H—H.

The pulley 30 is wound with a cable 34 which extends therefrom over additional pulleys 36 to the indicator assembly 38 where it connects to a reticule plate 40. The reticule plate is mounted in a vertical plane in the indicator and adapted to slide horizontally in response to movement of the cable as caused by the winding and unwinding thereof on the gun pulley 30 as the gun is moved in azimuth. Only a single line system is shown; the reticule being spring loaded in one direction at 42. However, it is obvious that a double line system or a rod and bellcrank linkage may be substituted in accomplishing the purpose of having the reticule plate move in unison with the gun.

Similarly, the pulley 32 is wound with a cable 44 which extends therefrom over additional pulleys 46 to the indicator 38 where it connects to a reticule plate 48. This reticule plate is likewise mounted in a vertical plane alongside the plate 40 and is adapted to slide vertically with respect thereto in response to movement of the cable 44 winding and unwinding on the gun pulley 32 as the gun is moved in elevation. A spring 50 serves in the same capacity as the spring 42.

The reticule plate 40 has a vertically extending slot 52 and the reticule plate 48 has a horizontally extending slot 54 so placed and of such length that a portion of each is always in registry with a portion of the other. Now, it may be noticed that an electric lamp 56 is placed in the indicator 38 on one side of the reticule plates. When the lamp is lighted the light is obstructed by the reticule with the exception of that beam which shines through the slot portions in registry. This beam is thrown upon a translucent screen 58, which serves as the face of the indicator, and shows therethrough as a spot of light 60. An opaque vignette 62 of the empennage 12 is placed upon the screen and, since the spot of light represents the point at which the gun 14 is aiming, movement of this spot relative to the vignette tells the pilot at a glance when and how it is desirable for him to maneuver the aircraft to the best advantage for his gunner.

The lamp 56 receives its electrical supply from a source 64 and may be turned on and off by a switch 66. This electrical source also supplies current to a lamp 68 placed in the lower center of the indicator screen.

The lamp 68 is controlled by the gun operated switch assembly 70 having a vertically extending member 72 which is engageable by the gun barrel to close the switch. This unit is the interrupter previously mentioned. The member 72 is so placed relative to the gun and to the empennage that it will not permit the gun barrel to be moved into a position wherein it would be aiming at the empennage or any other structural part of the aircraft. By so combining the interrupter and switch in signalling the pilot a second warning is supplied to the effect that maneuvering is required to permit the gunner to aim at his target. The interrupter may be of the type just described, i. e., one that limits the aiming movement of the gun, or it may be of a type which renders the gun inoperative or, in other words, incapable of firing when the barrel moves into the restricted area.

Figure 3 depicts an electrical embodiment of the invention. The gun 14 is identically mounted on the base 28 but in this instance the azimuth pulley 30 of Figure 2 is replaced by a gear 74 which is in mesh with a small gear 76 adapted to drive an electrical device 78 such as an Autosyn, Telegon, or Selsyn. In the same manner the elevation pulley 32 of Figure 2 is replaced by a gear 80 which is in mesh with a smaller gear 82 adapted to drive an electrical device 84 of the same type as the device 78.

An electrical lead 86 extends from the device 78 to an identical device 88, and a lead 90 interconnects the device 84 and an identical device 92. The devices operated by motion of the gun send signals which operate the devices 88 and 92, each of which has a threaded shaft 89 and 93 adapted to drive a reticule plate. With the exception of the difference in the manner of driving the reticule plates the indicator shown in Figure 2 is identical to the indicator 38 of Figure 1 and accordingly the same numerals are used for the component parts.

Since the electrical devices 78 and 84 are directly driven by and in accordance with the movements of the gun in azimuth and elevation and since the devices 78 and 84 send signals to the reticule driving devices 88 and 92 respectively to drive them strictly in accordance with the movement of the devices 78 and 84, it is obvious that the reticule slots will be so moved as to cause the beam of light coming therethrough from the lamp 56 to move on the screen 58 of the indicator in a manner such that it traces the aiming movements of the gun. The gun operated interrupter switch 70 is also shown in this embodiment as it would be hooked thereinto.

Figure 4 is a detail view looking at the screen 58 of the indicator 38 from the pilot's position. The vignette 62 of the empennage is pictured as a mirror image, however it may be made otherwise if desirable under certain conditions. It is also contemplated that other vignettes could be placed upon the screen as necessary to suit particular conditions. For convenience the interrupter lamp 68 has been placed in the lower central portion of the vignette. The light spot 60 indicating the aiming point of the gun is shown in the upper right hand corner of the screen and moves relative to the vignette in accordance with the dictates of the gun movements as transmitted to the reticule plates 40 and 48.

Figure 5:
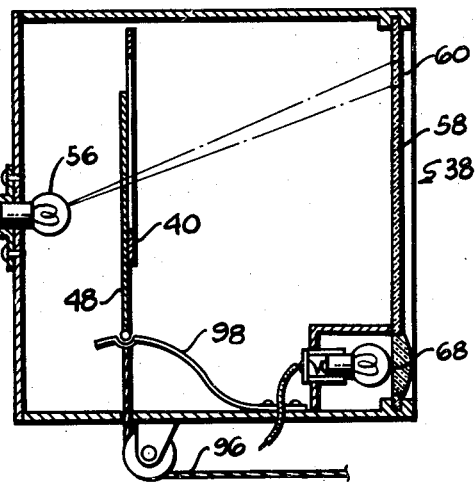
Figure 5 is a cross sectional view of an embodiment of the indicator.

Figure 5 is a cross sectional view in side elevation of an indicator 38 showing the relative positions of the light beam producing lamp 56, the reticule plates 40 and 48, the screen 58, and the interrupter light 68. In this view I have shown the reticule plates as being actuated mechanically by a cable 96 in one direction and by a leaf spring 98 in the other direction.

Figure 6:
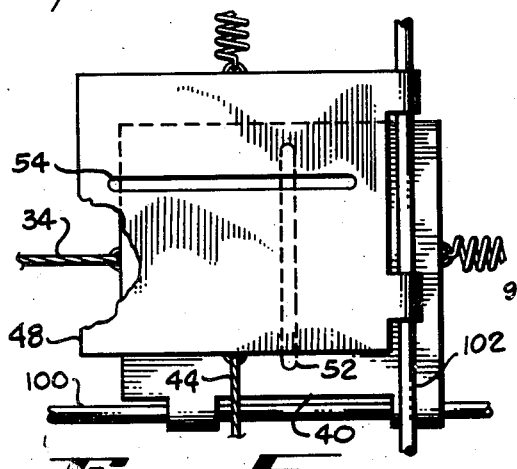
Figure 6 is a diagrammatic view of a slotted reticule in which parts are relatively movable by the gun to direct a spot of light on the screen of the indicator.
Figure 7:
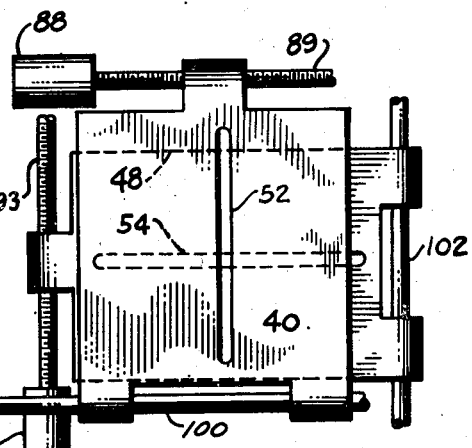
Figure 7 is a view similar to Figure 6 but showing a different embodiment of the reticule drive.

Figures 6 and 7 are detail front elevational views of the reticule, with the Figure 6 showing corresponding to Figure 2 and the Figure 7 showing corresponding to Figure 3. Slides 100 and 102 are provided for supporting the reticule plates so that they may be moved therealong by the cables 34 and 44 or by the threaded shafts 89 and 93 of the electrical devices 88 and 92. It will be noted that in Figure 7 the reticule plates have been reversed from that shown in Figure 6. That is to say in Figure 7 the plate 40 having the vertical slot 52 is between the plate 48 and the indicator screen. This is of no consequence. The only important element to be considered is the registry of the slot portions with each other relative to the light beam. Of course, it is obvious that the vertically slotted plates must always move horizontally and the horizontally slotted plate must always move vertically in order to properly direct the beam of light.

Figure 8:
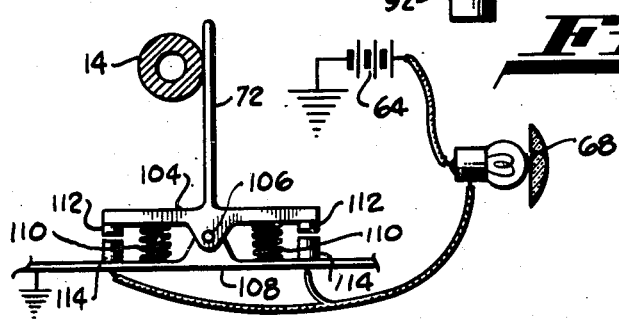
Figure 8 is a diagrammatic view of an interrupter adapted to be engaged by the gun when the gun moves into aiming or firing position with respect to the empennage of the aircraft and to indicate this condition to the pilot by lighting a lamp in the indicator unit.

The interrupter switch 70 is shown in detail in Figure 8. The member 72 which is adapted to be engaged by the gun 14 is mounted on a cross arm 104 pivoted at 106 to a base 108 and spring-centered in a vertical position by springs 110. An electrical contact 112 is provided at each end of the arm 104 and is adapted to make and break with a contact 114 provided therebelow on the base. The contacts 114 are then wired to the indicator lamp 68 so that when the gun engages and displaces the member 72 it rocks the cross arm 104 and makes contact at either end thereof depending upon the direction in which the member 72 is displaced. This completes the lamp circuit and the lamp is lighted from electrical source 84.

While I have herein shown and described my invention in specific embodiments I do not wish to be limited other than by the breadth of the appended claims for the reason that it will be obvious to those skilled in the art, after understanding the invention, that the teaching thereof may be applied in ways different from those shown without departing from the scope of the invention.

I claim:

1. In a device for indicating to the pilot of an aircraft the movement of a remotely located gun relative to a firing obstruction, mechanical means driven by said moving gun, an indicator located within the range of vision of said pilot and so driven by said mechanical means as to visually describe the movement of said gun, a vignette of said obstruction visually associated with said indicator, stop means engageable by said gun to prevent firing into the obstruction, and a second indicator operatively connected to said stop means and adapted to be actuated when said gun engages said stop means.

2. In a device for indicating to the pilot of an aircraft the point at which a remotely located gun is aiming relative to a firing obstruction, means mounting said gun for movement in azimuth and elevation, a transmitter operated in conjunction with the movement of said gun and adapted to transmit signals in accordance with the line of fire of said gun relative to said obstruction, a screen, a vignette of said firing obstruction on said screen, a beam of light adapted to move about on said screen, a receiver adapted to pick up the signals emanating from said transmitter and control the movement of said beam of light in accordance therewith to indicate to the pilot the point at which the gun is aiming relative to said obstruction, a second indicating means visible on said screen, stop means preventing the gun from firing at the firing obstruction, and means operatively interconnecting said stop means and second indicating means to indicate when said gun has engaged said stop means.

3. In a device for signalling to the operator of a vehicle the approach and advent of the necessity for altering the direction of the vehicle to relatively shift the line of fire of a remotely located gun thereon with respect to an operator-shiftable portion of the vehicle endangered by said line of fire, the combination of: means for mounting said gun for movements in azimuth and elevation; means for transmitting impulses generated thereby to a point adjacent the operator's station; visual signalling means thereat adapted to be operated by said transmitting means to signal the operator the approach of said necessity; and a second visual signalling means located adjacent said operator's station and adapted to be actuated by the movements of said gun independently of said transmitting means to signal the operator the advent of said necessity.

4. In a device for signalling to the operator of a vehicle the approach and advent of the necessity for altering the direction of the vehicle to relatively shift the line of fire of a remotely located gun thereon with respect to an operator-shiftable portion of the vehicle endangered by said line of fire, the combination of: means mounting said gun for movement in azimuth and elevation; means transmitting impulses generated thereby to a point adjacent the operator's station; visual signalling means thereat, including a reference area and a luminous index movable with respect thereto by said transmitting means, to signal the operator the approach of said necessity; and a second visual signalling means located adjacent said operator's station and adapted to be illuminated by the movements of said gun independently of said transmitting means when the line of fire thereof closely approaches said movable portion, to signal the operator the advent of said necessity.

5. A device for visually signalling to the pilot of an aircraft the approach of the firing line of a rearwardly located movable firearm to a structural portion of the aircraft comprising: means operatively associated with the azimuthal and elevational movements of said gun and adapted to forwardly transmit impulses in accordance with said movements; a laterally movable, vertically reticulate diaphragm operatively associated with said impulse-transmitting means to be moved laterally by the azimuthal component of the movements of said firearm; a vertically movable, laterally reticulate diaphragm operatively associated with said impulse-transmitting means to be moved vertically by the elevational components of the movements of said firearm and disposed adjacent the first said diaphragm with its reticule normally in registry with the first said reticule to define a movable light ray window adapted to positively deflect light impinging thereupon; a light source disposed on one side of the reticulate barrier and adapted to direct light through said window; and a screen on the opposite side of said barrier and adapted to intercept the light passing through said window and including an independently and permanently visible representation of the obstruction disposed within the range of movement of the light ray passing through said window, whereby the movements of the intersection-point of the light ray with the screen with reference to the representation are adapted to initiate pilot-actuated movement of said structural portion away from the line of fire.

SYDNEY J. GOLDBERG.

REFERENCES CITED

The following references are of record in the file of this patent:

UNITED STATES PATENTS

| Number | Name | Date |
|---|---|---|
| 2,196,269 | Morris | Apr. 9, 1940 |
| 2,413,785 | Robinette | Jan. 7, 1947 |

FOREIGN PATENTS

| Number | Country | Date |
|---|---|---|
| 11,442 | Great Britain | July 4, 1912 |
| 772,998 | France | Aug. 25, 1934 |